Feb. 12, 1946.   R. T. MAKIE   2,394,706
FISH POLE
Filed June 27, 1944
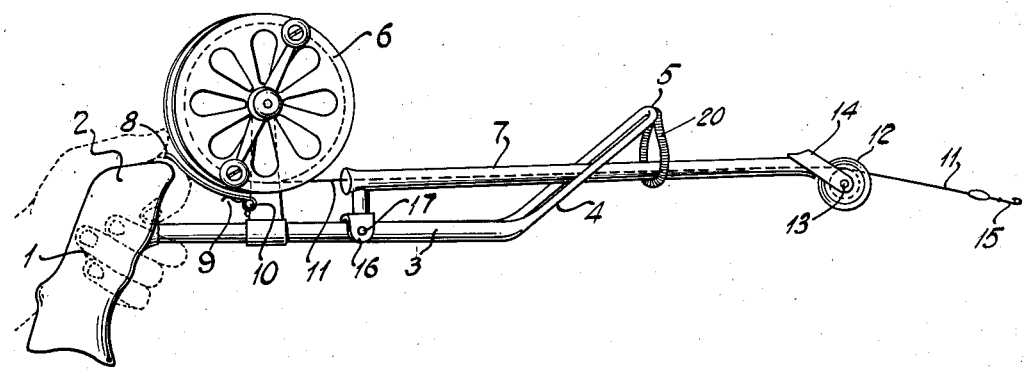
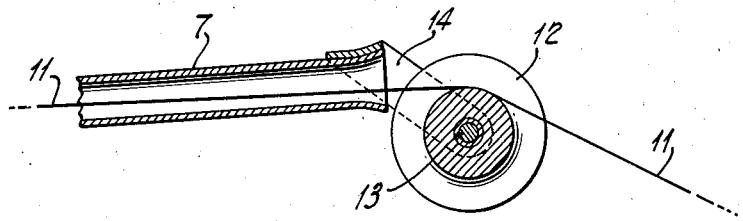
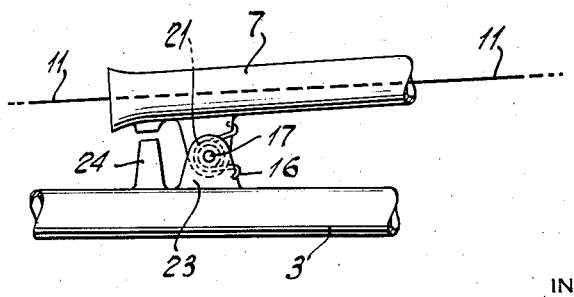
INVENTOR
RICHARD T. MAKIE.
BY
ATTORNEY Patented Feb. 12, 1946

2,394,706

UNITED STATES PATENT OFFICE 2,394,706

FISH POLE

Richard T. Makie, Tompkins County, N. Y.

Application June 27, 1944, Serial No. 542,299

6 Claims. (Cl. 43—18)

This invention relates to fishing poles and tackle, and has for its principal object the production of a more compact and convenient device which is not liable to become entangled in the woods and which can be tossed into a car without dismantling. A further object is to provide the yielding characteristics of a long rod without the bulk of a flexible pole. Various other features relating to the mechanical construction and ease of control will become apparent as the description proceeds.

Referring now to the drawing forming part of this specification,

Fig. 1 is a side view of the apparatus.

Fig. 2 is a view partly in cross-section of the outer end of the tube and roller which guide the line.

Fig. 3 shows another form of retracting spring which may be used.

Similar reference numerals refer to similar parts thruout the various views.

As shown in Fig. 1, the device consists in general of a pistol-type grip 1 having a knob 2 extending above the point at which the stub-rod 3 is attached, so that when it is held in the hand the forefinger may be above the rod 3 and the middle finger below the rod 3 to give a better grip. At the end of the stub-rod 3 is a slotted portion or fork 4 closed at its upper end 5 and extending at an angle to the stub-rod 3. Also mounted on the stud-rod 3 is a reel 6 and a pivoted line guide tube 7. The reel 6 is provided with a rim brake 8 which can be controlled by the operator's thumb, this brake 8 being normally held against the rim of the reel by the force of the coil spring 9 near its pivot 10.

The line 11 wound on the reel 6 feeds into the adjacent end of the guide tube 7 and out the other end of that tube and over the roller 12, which turns on the bearing 13 mounted in the arms 14. The arms 14 are secured to the guide tube 7 by any suitable means such as riveting or welding, or may be made integral. At the end of the line 11 is the usual hook 15 and the fishing devices ordinarily associated therewith. The roller 12 is illustrated in greater detail in Fig. 2, which shows the line 11 extending thru the hollow tube 7, from which extend downwardly the arms 14 carrying the bearing 13 on which turns the roller or guide wheel 12. The roller 12 is deeply grooved, provided with high side walls, and so located that the line 11 normally runs tangentially on the bottom of the groove; but the groove is so deep that the line will not jump the roller when it is whipped about in use.

At the end near the reel the guide tube 7 is pivotally mounted on the stub-rod 3 by means of a bracket 16 having a pivot pin 17. This pivoted guide tube 7 plays up and down in the fork 4 against the action of the retracting spring 20 and thus forms a yielding element giving an effect similar to a long flexible pole. Various forms of retracting spring may be used, the form illustrated in Fig. 1 being a long, light coil spring bent into a loop extending around the tube 7 and attached to the top of the closed fork 4, somewhat as one might attach a rubber band. Another form, shown by way of example in Fig. 3 consists of a relatively stiff coil torsion spring 21 wound around the pivot pin 17, with its ends secured to the bracket 16 and the guide tube 7 respectively, so as to force the tube upward against the tension of the fish line. Various other forms of spring mounting will be apparent to those skilled in the art, the essential feature being that the guide tube pivotally mounted on the stub-rod be operative with a yielding retractive force, so as to avoid the rigidity heretofore associated with abbreviated equipment.

While I have shown a bifurcated element or fork 4 as a preferred form, it will be understood that other lateral guides and limit stops may be used, as for example in Fig. 3 where the sides 23 of the pivot bearing 17 may form the lateral guides and the projection 24 on the stub-rod 3 may form the limit stop. The preferred form however avoids concentrated stresses and combines lightness with rigidity against lateral forces. To further obtain lightness and rigidity I prefer to make the stub-rod and fork, as well as the guide 7, of tubing, though this depends on the materials used. Of course, wood and light metals or plastics might be used solid without undue weight.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

I claim:

1. In a fishing apparatus, the combination of a grip, a stub shaft extending from said grip, a reel and line, a guide rod element carrying said line and pivotally mounted on said stub shaft for oscillation relative thereto, and a retracting spring against which the guide rod element may yield to provide an element of flexibility when the line is under tension.

2. In a fishing apparatus, the combination of a grip, a stub shaft extending from a side of said grip, a reel and line, a guide rod element carrying said line and pivotally mounted on said stub shaft for oscillation relative thereto, a deeply flanged roller at the outer end of said guide rod element to provide a roller bearing for the line, and a retracting spring against which the guide rod element may yield to provide an element of flexibility when the line is under tension.

3. In a fishing apparatus, the combination of a grip, a reel and line, a stub shaft extending from said grip, a guide tube for said line, said guide tube being pivotally mounted on said stub shaft, and a retracting spring against which the pivoted guide tube may yield to provide an element of flexibility when the line is under tension.

4. In a fishing apparatus, the combination of a grip, a stub shaft extending from a side of said grip, a reel and line, a guide tube for said line, said guide tube being pivotally mounted on said stub shaft, a retracting spring against which the pivoted guide tube may yield to provide an element of flexibility when the line is under tension, and a deeply grooved roller at the outer end of the guide tube to provide a roller bearing for the line.

5. In a fishing apparatus, the combination of a grip, a stub shaft extending from said grip, a reel and line, a guide tube for said line, said guide tube being pivotally mounted on said stub shaft, a slotted extension on said stub shaft in which said tube may play and receive lateral support, and a retracting spring against which the pivoted guide tube may yield to provide an element of flexibility when the line is under tension.

6. In a fishing apparatus, the combination of a grip, a stub shaft extending from a side of said grip, a reel and line, a guide tube for said line, said guide tube being pivotally mounted on said stub shaft, a slotted extension on said stub shaft in which said tube may play and receive lateral support, a retracting spring against which the pivoted guide tube may yield to provide an element of flexibility when the line is under tension, and a deeply grooved roller at the outer end of the guide tube to provide a roller bearing for the line.

RICHARD T. MAKIE.